US012711024B2

(12) United States Patent
Frid et al.

(10) Patent No.: US 12,711,024 B2
(45) Date of Patent: Aug. 18, 2026

(54) APPARATUS FOR ALLOWING THE PROTECTED mSets TO CONTINUE TO BE USED DURING CONTROL SYNC (CS) ON THE BASE OF SHADOW uLayer

(71) Applicant: Sandisk Technologies, Inc., Milpitas, CA (US)

(72) Inventors: Marina Frid, Jerusalem (IL); Vered Kelner, Gan Haim, IL (US); Igor Genshaft, Bat Yam (IL)

(73) Assignee: Sandisk Technologies, Inc., Milpitas, CA (US)

( * ) Notice: Subject to any disclaimer, the term of this patent is extended or adjusted under 35 U.S.C. 154(b) by 25 days.

(21) Appl. No.: 18/914,949

(22) Filed: Oct. 14, 2024

(65) Prior Publication Data

US 2026/0104969 A1 Apr. 16, 2026

(51) Int. Cl.
*G06F 11/00* (2006.01)
*G06F 11/1446* (2026.01)

(52) U.S. Cl.
CPC .... *G06F 11/1469* (2013.01); *G06F 2201/805* (2013.01)

(58) Field of Classification Search
CPC ........................ G06F 11/1469; G06F 2201/805
See application file for complete search history.

(56) References Cited

U.S. PATENT DOCUMENTS 10,359,955 B2 7/2019 Inbar et al.
10,754,785 B2 8/2020 Zhang et al.
11,853,603 B2 12/2023 Hahn et al.
2018/0239547 A1* 8/2018 Inbar .................. G06F 12/0246
2023/0102184 A1* 3/2023 Dirik .................. G06F 12/0891 711/154
2023/0315285 A1 10/2023 Ionin et al.
2024/0086071 A1 3/2024 Gorrle et al.

* cited by examiner

*Primary Examiner* — Jason B Bryan
(74) *Attorney, Agent, or Firm* — Patterson + Sheridan, LLP

(57) ABSTRACT

The apparatus for recovery of protected segments (mSets) at run time or after an ungraceful shutdown (UGSD) event, such as in a host memory buffer (HMB) error case, utilizes a shadow structure (e.g., shadow update layer (uLayer)) that is be stored in the memory device (e.g., flash) in an mBlock and is used only for recovery of protected mSets. The approach also allows significantly increasing a number of protected mSets because the proposed shadow uLayer structure avoids flushing all protected mSets at Control Sync (CS). The expected performance gains and reducing of write amplification of control data cover the overhead costs of processing the shadow structure.

16 Claims, 8 Drawing Sheets

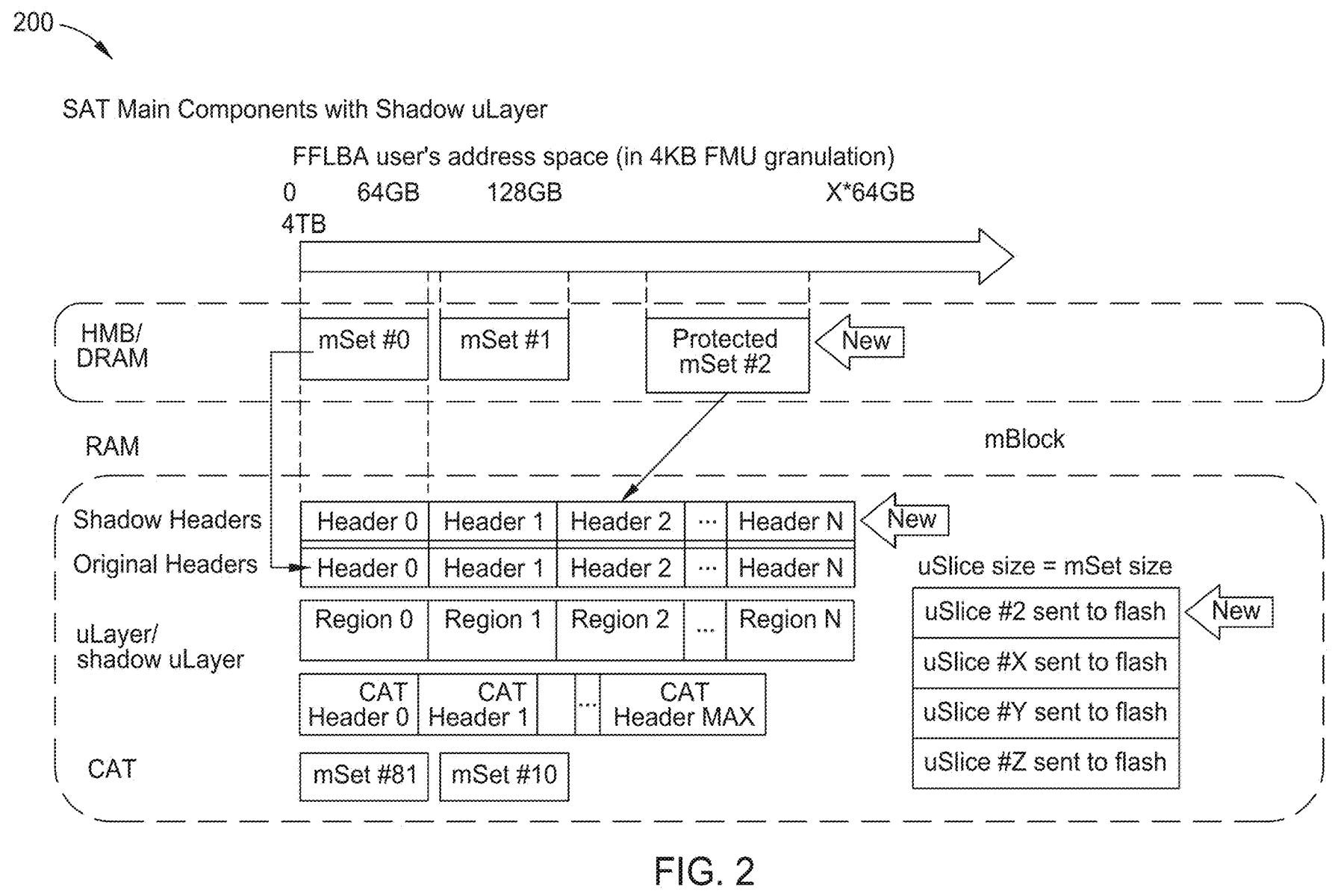

200

SAT Main Components with Shadow uLayer

FFLBA user's address space (in 4KB FMU granulation)

0 64GB 128GB X*64GB

4TB

HMB/
DRAM mSet #0 mSet #1

Protected
mSet #2

New

RAM mBlock

Shadow Headers

Original Headers

Header 0 | Header 1 | Header 2 | ... | Header N

New

Header 0 | Header 1 | Header 2 | ... | Header N uLayer/
shadow uLayer

Region 0 | Region 1 | Region 2 | ... | Region N

CAT Header 0 | CAT Header 1 | ... | CAT Header MAX

CAT mSet #81 | mSet #10 uSlice size = mSet size uSlice #2 sent to flash

New uSlice #X sent to flash uSlice #Y sent to flash uSlice #Z sent to flash

FIG. 2

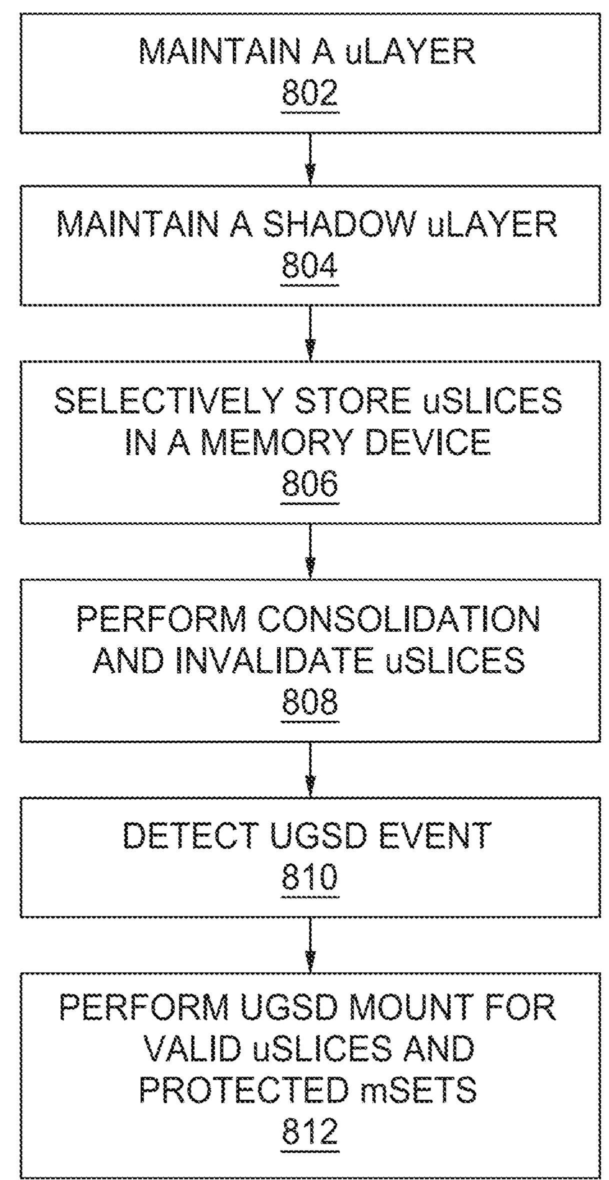
FIG. 8

APPARATUS FOR ALLOWING THE PROTECTED mSets TO CONTINUE TO BE USED DURING CONTROL SYNC (CS) ON THE BASE OF SHADOW uLayer

BACKGROUND OF THE DISCLOSURE

Field of the Disclosure

Embodiments of the present disclosure generally relate to improving storage device utilization.

Description of the Related Art

Storage devices use logical-to-physical (L2P) mapping and use management tables with control data for dynamic mapping. The management tables are stored in flash memory (e.g., NAND), but in order to provide high performance management, copies are maintained in the controller random access memory (RAM). Modern devices have dual-layered mapping architecture consisting of a Master Layer (mLayer) and an Update Layer (uLayer). The mLayer size is relatively big and the structure of the mLayer is regular (direct-access array). The uLayer size is much smaller and the structure of the uLayer is less regular. Mapping of the same logical block address (LBA) range can have a different size at different times.

The mLayer can be easily divided into equal segments (mSets), which can be saved to flash and loaded from flash (i.e., swapped out and in) when needed. Low-RAM devices have a limited amount of RAM and therefore keep there the uLayer of limited constant size regardless of the device capacity. The uLayer contains the most recent mapping in the form of ranges that allows for scanning only part, referred to as the Update Region (uRegion), of the uLayer during consolidation or translation. The purpose of the uLayer is to aggregate multiple control-updates for the same uRegion that has N mSets per uRegion, including consolidation of trapped uRegions. Each uRegion has an Update Header (uHeader) that contains the number of entries (uRun) in the uRegion and other information for the entire uRegion.

In Random Write (RW) cases, the uLayer overflows relatively quickly and leads to consolidation of uLayer updates with mSets (e.g., mLayer). Thus, good RW performance can be achieved as a compromise between the number of accumulations of the latest updates in uLayer and the number of mSets stored on flash.

RW performance is CPU limited. The mSet for consolidation in RAM contains all mapping and uLayer does not contain its uRuns, so as result, all such mSets are saved on flash on/before Control Sync (CS). Thus, skipping uLayer updates, delayed writing on flash, and reducing the amount of consolidation should improve RW performance and Write Amplification (WAMP). However, for low-RAM devices, the number of cached mSets is limited and so, performance of just narrow RW tests can be improved.

For improving RW performance and latency for large ranges tests, creating the protected mSets for consolidation in host memory buffer (HMB), for example, can help because such mSets contain all mapping and the uLayer does not contain its uRuns. As a result, uLayer updates can be skipped. However, recovery of HMB protected mSets in case of errors (e.g., HMB disabled error, PCI bus error, etc.) would be valuable because the protected mSets for consolidation should be recovered in HMB error case.

Therefore, there is a need in the art for efficient recovery of protected mSets.

SUMMARY OF THE DISCLOSURE

The apparatus for recovery of protected segments (mSets) at run time or after an ungraceful shutdown (UGSD) event, such as in an host memory buffer (HMB) error case, utilizes a shadow structure (e.g., shadow update layer (uLayer)) that is be stored in the memory device (e.g., flash) in an mBlock and is used only for recovery of protected mSets. The approach also allows significantly increasing a number of protected mSets because the proposed shadow uLayer structure avoids flushing all protected mSets at Control Sync (CS). The expected performance gains and reducing of write amplification of control data cover the overhead costs of processing the shadow structure.

In one embodiment, a data storage device comprises: a memory device; and a controller coupled to the memory device, wherein the controller is configured to: maintain an update layer (uLayer), wherein the uLayer is configured to maintain updates for non-protected segments (mSets), wherein non-protected mSets remain resident in random access memory (RAM) until a control sync (CS) operation; and maintain a shadow uLayer, wherein the shadow uLayer is configured to maintain updates for protected mSets, wherein protected mSets are stored in the memory device after consolidation.

In another embodiment, a data storage device comprises: a memory device; and a controller coupled to the memory device, wherein the controller is configured to: perform an ungraceful shutdown (UGSD) operation; power up the device; detect that a UGSD event occurred; and perform a UGSD mount operation, wherein the UGSD mount operation comprises load valid uSlices from the memory device to random access memory, wherein uSlices are portions of a shadow update layer (uLayer), and wherein the shadow uLayer is configured to maintain updates for protected RAM segments (mSets), and wherein protected mSets are stored in the memory device after consolidation.

In another embodiment, a data storage device comprises: means to store data; and a controller coupled to the means to store data, wherein the controller is configured to: maintain both an update layer (uLayer) and a shadow uLayer, wherein the uLayer corresponds to non-protected segments (mSets) stored in random access memory (RAM) and the shadow uLayer corresponds to protected mSets; selectively store portions of the shadow uLayer (uSlices) in the means to store data; and invalidate uSlices upon storing protected mSets to the means to store data.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 2 is a schematic illustration of SAT main components according to one embodiment.

FIG. 8 is a flowchart of a process according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The apparatus for recovery of protected segments (mSets), which in some cases are protected and in others not-protected, at run time or after an ungraceful shutdown (UGSD) event, such as in an host memory buffer (HMB) error case, utilizes a shadow structure (e.g., shadow update layer (uLayer)) that is be stored in the memory device (e.g., flash) in an mBlock and is used only for recovery of protected mSets. The approach also allows significantly increasing a number of protected mSets because the proposed shadow uLayer structure avoids flushing all protected mSets at Control Sync (CS). The expected performance gains and reducing of write amplification of control data cover the overhead costs of processing the shadow structure.

Figure 1:
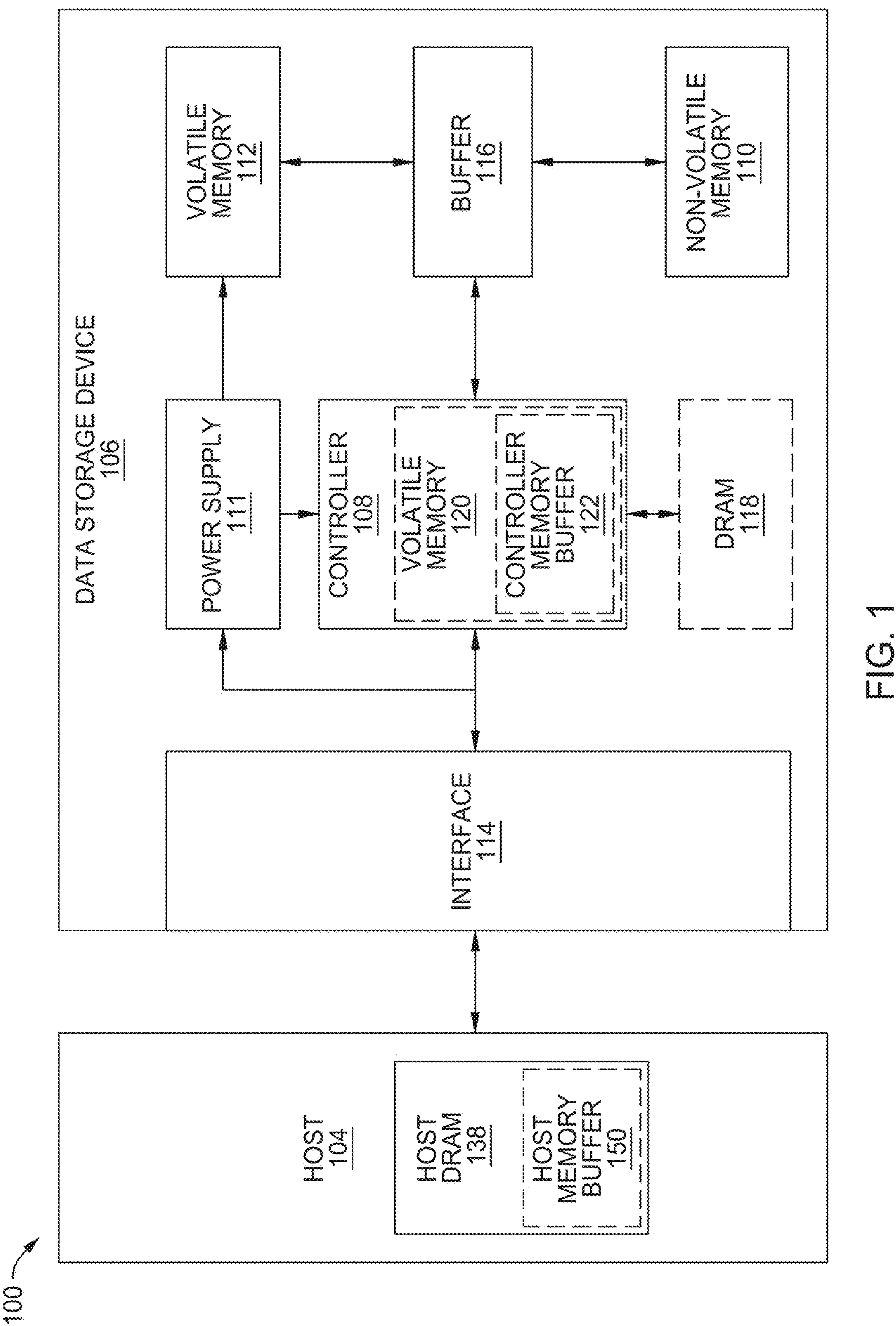
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110. Controller 108 may include circuitry or processors configured to execute programs for operating the data storage device 106.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 3:
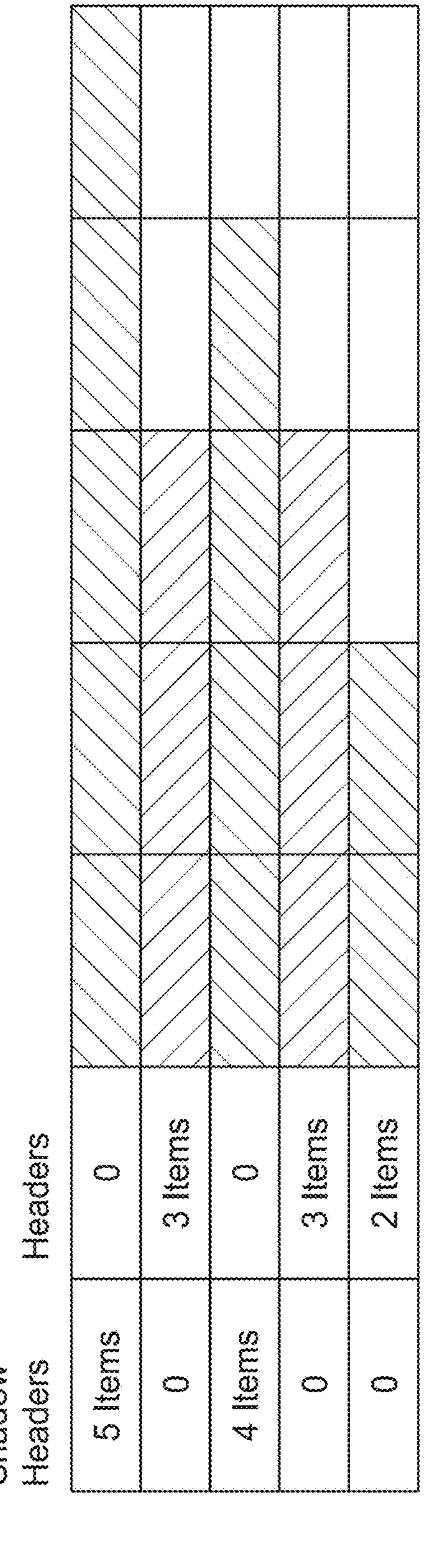
FIG. 3 is a schematic illustration of a uLayer structure with shadow headers according to one embodiment.

FIG. 2 is a schematic illustration 200 of SAT main components according to one embodiment. FIG. 3 is a schematic illustration 300 of a uLayer structure with shadow headers according to one embodiment. As will be discussed herein, the disclosure involves accumulating all updates for protected mSets in HMB in a new uLayer shadow structure for eventual HMB recovery at run time or after UGSD. The uLayer shadow structure will be managed as discussed below.

The shadow uLayer structure will be divided to uSlices as shown in FIG. 3. All protected mSets in HMB will save all updates to uSlice buffers according to #uSlice. Each uSlice should be saved to main blocks of the memory device (mBlocks) on uLayer overflow (no Items). Each uSlice might be saved up to X times (where x is a predetermined integer) until consolidation of all protected mSets.

Because all needed uLayer mapping from protected mSets are stored in a shadow uLayer structure, the following features can be implemented. If the protected mSet was created in CAT SRAM, saving on flash is needed on CS or before transfer to HMB. If the protected mSet was created in CAT HMB, no need to save on flash before transfer to HMB. Consolidation of protected mSets in CAT HMB before/on CS is not a must, it will be preferable to save a predetermined number, and it may be preferable to save a uSlice to free items from the item pool. The shadow uLayer structure improves accumulation in the uLayer and, as a result, reduces WAMP of saving mSets on flash. The uLayer headers and shadow uLayer headers structures should be unified and use the same items memory pool.

The significant difference between uLayer and shadow uLayer is the following. The shadow uLayer is used for mSet HMB recovery only. The shadow uLayer structure is updated on each update to protected mSet in HMB only.

This way, the FTL can create, for example, 1024 protected mSets in an HMB with a shadow uLayer, and there is no need to flush all of the protected mSets on CS or on a graceful shutdown (GSD). The proposed mechanism allows a flush for example, 10% of protected mSets on CS, storing uSlices on flash with other updates if needed, and storing uLayer with shadow headers in log.

It is to be noted that the embodiments herein are not limited to HMB. Rather, other types of memory are also contemplated such as DRAM. Additionally, the number of protected mSets is limited only by GSD time and also in DRAM projects, but the shadow uLayer and recovery after GSD can eliminate the limitation.

The recovery of protected mSet in HMB will now be addressed. The process comprises the following. During run time, the mSet and relevant uSlice from flash is loaded and merged from the uSlice to the mSet. Then the protected mSet will be flushed by usual trigger. After UGSD, the mSet and several relevant uSlices from flash are loaded and merged from the uSlices to the mSet. Then the protected mSet will be flushed by usual trigger.

The following is an example of a preliminary calculation for a workload of 128 mSets. The uLayer has ~20 KB uRuns, for example SLC block size in FMU is 200 KB. Thus, the uLayer is consolidated 10 times between two CSs, and each mSet will accumulates a maximum of 400 (including tringle distribution) uRuns before consolidation, so it will be ~500 mSets (32 KB) for consolidation. For 4 uSlices (32 KB=4 KB entries), 200 KB/4 KB entries=50 uSlices (32 KB) saving on flash. The limitations are that the number of protected mSets without using the shadow uLayer is limited by GSD time, because all protected mSets must be saved on GSD and on CS. The number of protected mSets with a shadow uLayer might be significantly increased which will improve RW and read performance, especially in mixed RW/random read (RR) cases. However, the number is limited by recovery protected mSets time at UGSD. The limitation might be solved as a sensitive compromise between storing mSets (Flush) and storing uSlices.

For improving RW performance and latency for large ranges tests, creating the protected mSets for the entire random range test in DRAM/HMB can help, because such mSets contain all mappings and the uLayer does not contain its uRuns. Additionally, all protected mSets are saved on GSD and on each CS which leads to big latency during CS, peek in performance during CS, and timeout on GSD. The embodiments discussed herein can solve the above problems and in addition, as a part of the algorithm, provides HMB protected mSets recovery in case of any HMB errors (i.e., HMB disabled error, PCI bus error, etc.). This approach virtually increases uLayer size since the shadow uLayer (last updates) is flushed to mBlock by uSlices (minimal write unit) and, in the same time reduces number of mSets consolidations (i.e., flushing mSets to NAND). The virtual increase in uLayer size is determined by the number of valid uSlices in the mBlock, which is limited by the recovery time of the protected mSets after GSD/UGSD.

Figure 4:
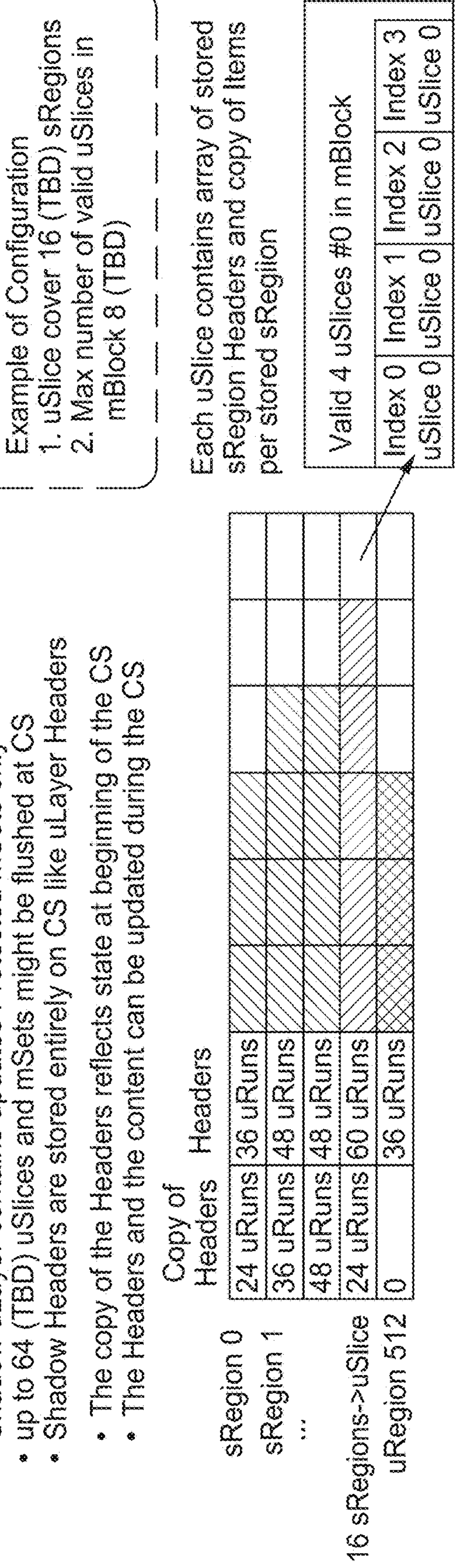
FIG. 4 is a schematic illustration of a uLayer and shadow uLayer design according to one embodiment.

FIG. 4 is a schematic illustration 400 of a uLayer and shadow uLayer design according to one embodiment. As shown in the illustration 400, the uLayer and shadow uLayer use a common item pool and mBlocks. The shadow uLayer structure if for protected mSets only, and there is no translation. The uSlice flush is performed by copying items to a CAT slot. As a configuration example, the uSlice covers 4 uRegions and the maximum number of valid uSlices in an mBlock is 8. The shadow uLayer contains header/copy header and 128 uSlices with items from the item pool. The uLayer contains header/copy header and 512 uRegions with items from the item pool. Only the last written mSet is valid in the mBlock.

As a point of clarification, the disclosure is dealing with the flash translation layer (FTL). The uLayer and mLayer where uLayer keeps the latest updates of the mapping is limited in size and is entirely in the RAM memory. While the mLayer keeps the entire mapping of the data storage device and is usually the most updated, except for the latest updates that are in the uLayer. The uLayer is responsible for mapping until the consolidation.

During the consolidation, some of the accumulated uLayer mapping is merged to the relevant mSets, and the mapping that has been merged is cleared in the uLayer. At this point in time, the mSets are responsible for the mapping that has been merged and are stored in the memory device (e.g., NAND). This means that non-protected mSets are stored in the memory device (e.g., NAND) immediately after the consolidation. Protected mSets remain resident in RAM until the CS. At the CS, the protected mSets have to be stored to memory device (e.g., NAND). The reason is to avoid updating the uLayer with the mapping that can be updated in the mSets. The uLayer remains not updated for the mSets that are protected. The drawback is that on the CS, all the protected mSets are stored in the memory device, and if there are many, it may take a long time and it may lead to increasing write amplification and latency. Therefore, the number of protected mSets may be limited even though it would be beneficial to extend the number of protected mSets.

Stated another way, the uLayer is responsible for the mapping until the Consolidation. The uLayer is stored to NAND during the CS. Consolidation merges some of the accumulated uLayer mapping to the relevant mSets and clears the merged mapping units in the uLayer. After the consolidation, the mSets are responsible for the mapping and have to be stored to NAND. Usual (not protected) mSets are stored to NAND immediately after the consolidation. Protected mSets remain resident in RAM until the CS, when the protected mSets are stored to NAND. Delayed storing of the protected mSets allows not updating the uLayer with the new mapping related to these mSets since the Consolidation until the CS. The drawback is that all protected mSets have to be stored to the memory device (e.g., NAND) on CS, which makes the CS too long and affects the device's Write Amplification and latency and finally leads to limiting number of the protected mSets to a relatively small number.

Figure 5:
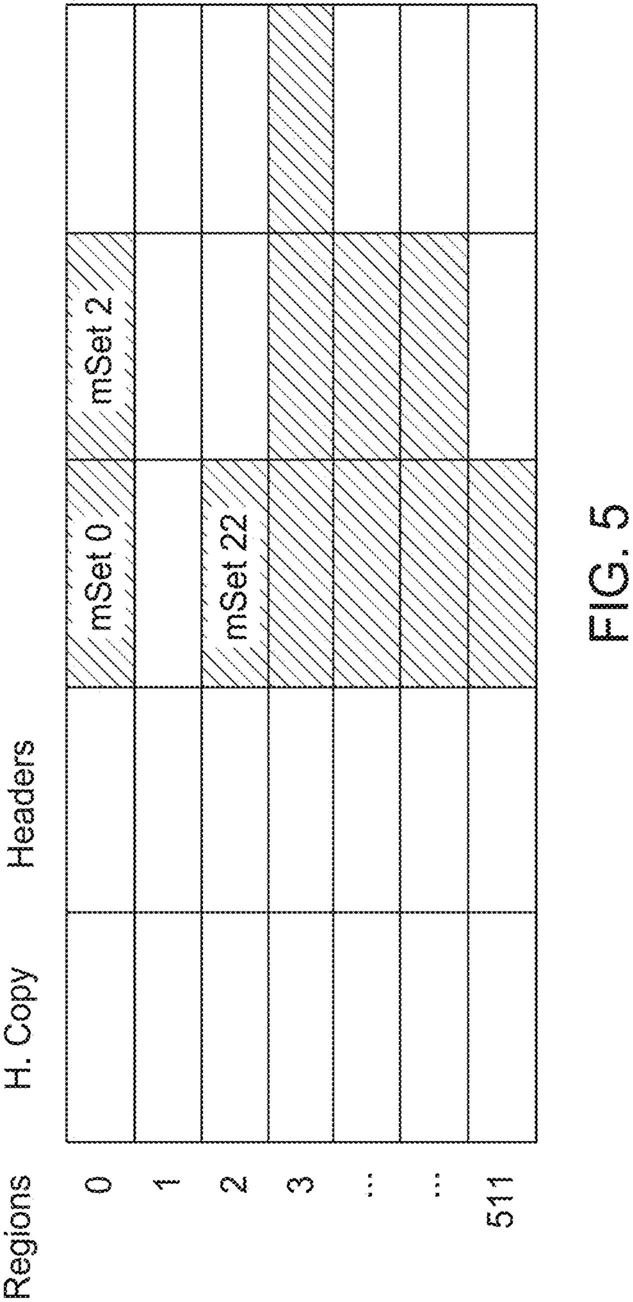
FIG. 5 is a schematic illustration of a uLayer according to one embodiment.

FIG. 5 is a schematic illustration 500 of a uLayer according to one embodiment. In regards to the main uLayer, the main uLayer keeps updates only for not protected mSets; is searched for translation; is stored entirely on CS; the copy of the headers reflects state at the moment of beginning of the CS and allow recovering after UGSD; the headers and the content can be updated during the CS; if no free items, some regions can be freed after consolidating and storing their mSets to NAND; and on UGSD mount, is loaded as is with replacing Headers with their copies made at the beginning of CS.

As shown in FIG. 5, the main uLayer is divided in into regions. For this example, there are about 512 regions from zero to 511. There are two headers. One of the headers is the main header and one of the headers is a copy. The copy is used during the CS. The rest of the uLayer is mapping that can be related to different mSets, but each region has a few mSets connected to it. For instance, it may be that region zero is responsible for the mSets for the first ten mSets. For example, region number one is responsible for the next ten mSets when the uLayer keeps updates for non-protected mSets because the protected mSets are not updated in the uLayer. Protected mSets allow skipping the uLayer updates so the uLayer keeps updates for the non-protected mSets that are searched for translation if needed. The main uLayer is stored entirely on CS. During the CS, all current headers are copied, so the header copy and header copy is what is used for the storing the uLayer in the memory device (e.g., NAND). The main headers maybe updated with the new translation while the CS is ongoing.

In case there is no free space or free items, some regions can be consolidated. It means the regions will be moved to their mSets. For instance, the mapping will be merged to the mSet 22 in FIG. 5 and cleared from the region and to free some memory. During power up, all of the uLayer is loaded, but in case of UGSD mount, the process is a bit more complex. There is a need to return to the state of the most recent CS and then recover the mapping that arrived after the CS. However, for returning to the states of the most recent CS, the uLayer is loaded as is and the headers are copied back to obtain the uLayer in the state that the uLayer was in at the beginning of the most recent CS.

Figure 6:
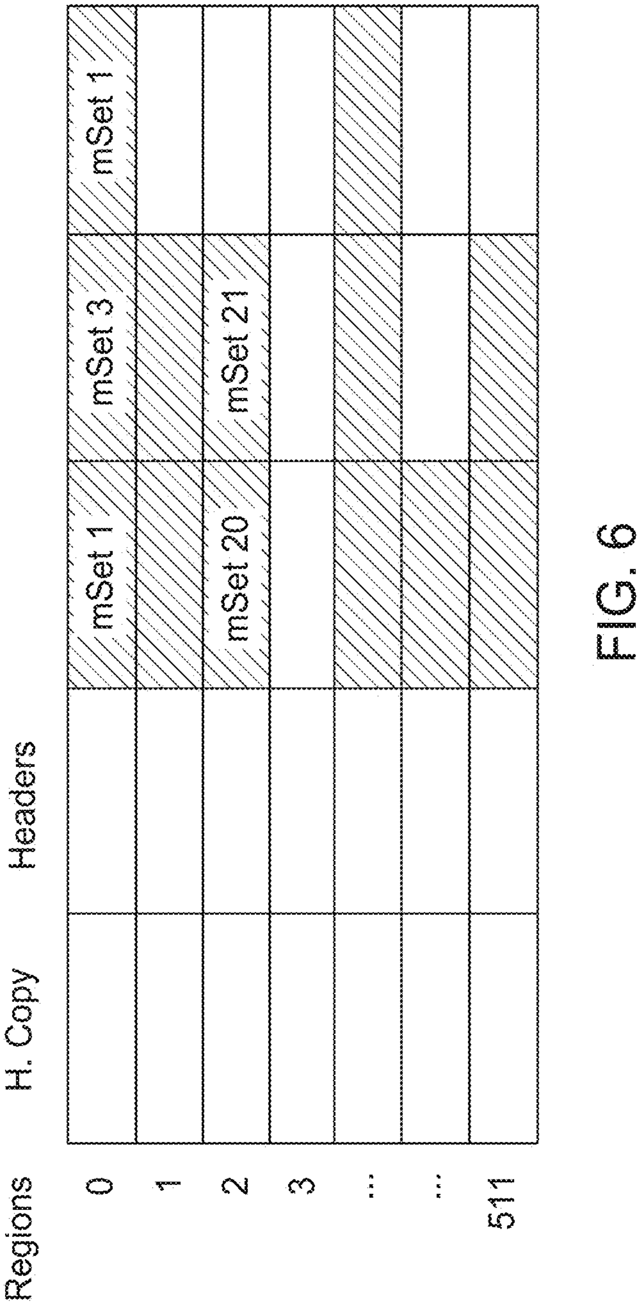
FIG. 6 is a schematic illustration of a shadow uLayer according to one embodiment.

FIG. 6 is a schematic illustration 600 of a shadow uLayer according to one embodiment. In regards to the shadow uLayer, the shadow uLayer keeps updates only for protected mSets; is never searched but it maintained for the purpose of avoiding storing all protected mSet on CS with keeping ability to recover them after UGSD; is stored entirely on CS; the copy of the headers reflects state at the moment of beginning of the CS and allow recovering after UGSD; the headers and the content can be updated during the CS; if no free items, some regions can be freed after either storing them as uSlices to NAND or storing their mSets to NAND, that will invalidate all previously stored uSlices for this region; and on UGSD mount, the valid uSlices are loaded one by one in their chronological order with replacing headers with their copies made at the beginning of CS and used for updating their mSets.

As noted above, the shadow uLayer keeps updates for protected mSets, and the shadow uLayer is never searched. The main uLayer is searched for translation. The shadow uLayer is never searched, and is only maintained for the purpose of avoiding storing of all protected mSets at once on CS, but allowing the ability to recover the mSets after a UGSD.

During the CS, the shadow uLayer is stored exactly as the main uLayer, but in case of consolidation or in case of no free items, there is a choice. Instead of consolidation that is done in the main uLayer, one option is to, for each region, choose either to store the entire region as is from the end as a uSlice. The other options is to consolidate the region and store in the memory device (e.g., NAND) so that the region can be cleared. The options gives an ability to choose whether to save a small uSlice or save all the mSets. The decision boils down to a balance between time and storage needs. Saving all the mSets takes more memory in the memory device. On the other hand, saving uSlices again and again and again for the same region will keep a lot of uSlices for this region and on UGSD, restoring the mapping all of the uSlices will take a lot of time because all of the uSlices will need to be loaded one by one and used for mapping to the related mSets.

An example of what may be done is to save a uSlice for every region a few, predetermined times. Then, once the predetermined number of times is reached, the mSets are saved because when the mSets are saved, all the previous uSlices for this region become obsolete. The approach provides a certain flexibility because otherwise there would have been protected many more mSets, but instead of saving all of them on every CS, a choice can be made. First of all, on the CS that will save the shadow uLayer structure, which is relatively small. When the structure is running out of memory, a decision can be made regarding whether to save a small uSlice or the mSets. For any given mSet when something is saved, a decision can be made regarding when to save mSets for a region and when to save mSets for another region. In the rest of the times, only small uSlices may be saved.

Summing up the shadow uLayer, the shadow uLayer allows avoiding storing all protected mSets on CS. Eventually, on CS, each shadow uLayer's region can be either stored to NAND as a uSlice or all protected mSets related to the region have to be stored to the memory device (e.g., NAND). Usually, a uSlice occupies less space than all the related mSets, improving the CS latency and Write Amplification. Until storing the region's mSets, the stored uSlices are responsible for the mapping. Once the region's mSets are stored to the memory device (e.g., NAND), all previously stored uSlices of the region become obsolete and the responsibility for the mapping is moved to the mSets. Balancing between storing the region as a uSlice to storing the region's mSets (separately for each region) reflects the trade-off between longer UGSD Mount (when many uSlices have to be handled) to longer CS (when many mSets have to be stored).

Figure 7:
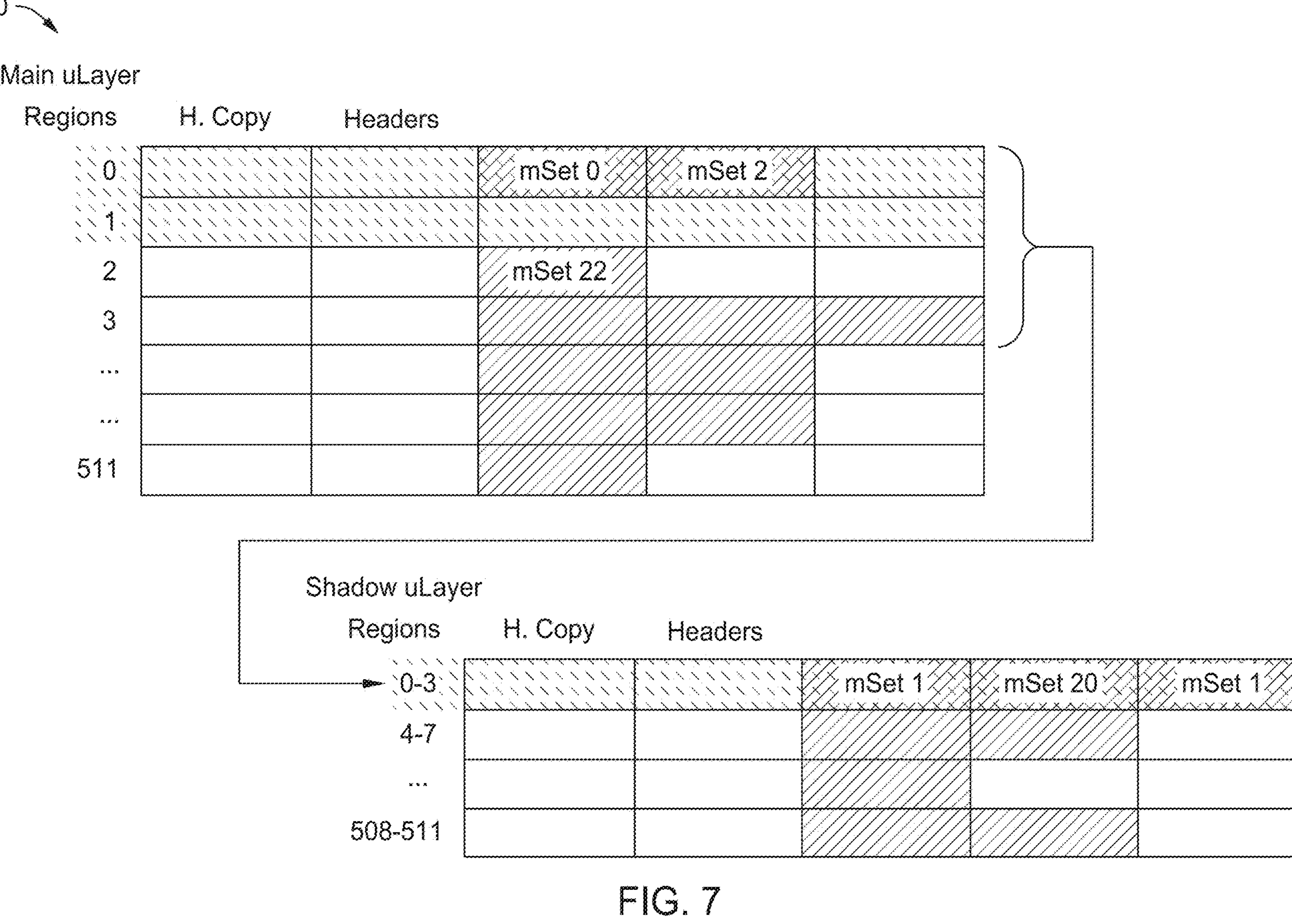
FIG. 7 is a schematic illustration of a uLayer and shadow uLayer design according to another embodiment.

FIG. 7 is a schematic illustration 700 of a uLayer and shadow uLayer design according to another embodiment. The correspondence between the regions in the main and shadow uLayers is not necessarily 1:1. In the example of FIG. 7, one region in the shadow uLayer corresponds to four regions in the main uLayer. For example, the main uLayer can be a few regions but correspond to a single region in the shadow uLayer. For example, one region in the main uLayer can be split into a few regions in the shadow uLayer according to different conditions.

The RAM for the main and shadow uLayers may be shared as well as separate, statically distributed as well as dynamically. In case of shared memory, on no free items either (or both) of the uLayers can be selected for consolidation.

FIG. 8 is a flowchart 800 of a process according to one embodiment. The process begins at block 802 where a uLayer is maintained and a shadow uLayer is maintained at block 804. Then, uSlices can be selectively stored in a memory device at block 806 and consolidation can be performed that invalidates the uSlices at block 808. A UGSD event may be detected at block 810, and thereafter a UGSD mount process can be performed at block 812 for valid uSlices and protected mSets.

The disclosure herein explains that dividing a uLayer into uSlices for mSets HMB Recovery has several advantages over a common log for all protected mSets. For example, uSlices allows an increase in the number of protected mSets in N (e.g., N=128) times which is beneficial because there is typically a limitation on the maximum number of flushed protected mSets on GSD. However, in uSlice case the protected mSets are flushed of only one uSlice because of uLayer overflow. The shadow uLayer reduces WAMP of saving protected mSets because of increasing accumulation of updates before flush on flash. Recovery of protected mSets can be done uSlice by uSlice for the next read-write on demand. uSlices use the uLayer memory (and don't require additional memory for Log) and use the uLayer algorithms including non-blocking CS. Thus, protected mSets can continue to be used during CS with uSlices, but it is impossible in case of common Log for all protected mSets. The uSlices use the mLayer algorithms which gives the unification and also allows to keep contiguous copies of the same uSlice in mBlock before flushing all protected mSets and nullifying the contiguous copies of the same uSlice. Such an approach will virtually increase uLayer space and also increase accumulation of updates before protected mSet flushing.

By using a shadow uLayer, RW and mixed RW/RR performance is greatly improved because of significantly increasing number of protected mSet using HMB. Additionally, the shadow uLayer solves the recovery problem of protected mSets in HMB. The shadow uLayer also reduces WA of control data (i.e., reduces the number of mSet Consolidations).

In one embodiment, a data storage device comprises: a memory device; and a controller coupled to the memory device, wherein the controller is configured to: maintain an update layer (uLayer), wherein the uLayer is configured to maintain updates for non-protected segments (mSets), wherein non-protected mSets remain resident in random access memory (RAM) until a control sync (CS) operation; and maintain a shadow uLayer, wherein the shadow uLayer is configured to maintain updates for protected mSets, wherein protected mSets are stored in the memory device after consolidation. The shadow uLayer is never searched. The shadow uLayer is maintained for avoiding storing all protected mSets on a CS operation while keeping an ability to recover protected mSets after ungraceful shutdown (UGSD) events. The controller is configured to periodically store a portion of the shadow uLayer (uSlice) in the memory device. The controller is configured to store the protected mSets in the memory device and invalidate the uSlices. The controller is configured to perform the CS operation, wherein during the CS operation all non-protected mSets are stored in the memory device, and wherein during the CS operation portions of the shadow uLayer (uSlices) are stored in the memory device. The controller is configured to balance between storing uSlices in the memory device and protected mSets in the memory device. A correspondence between regions in the uLayer and the shadow uLayer is not 1:1, and wherein a correspondence between regions in the uLayer and uSlices is not 1:1. RAM for the uLayer and the shadow uLayer is shared. The controller is configured to select either the uLayer or the shadow uLayer or both for consolidation upon a determination that there are no free items in the shared RAM.

In another embodiment, a data storage device comprises: a memory device; and a controller coupled to the memory device, wherein the controller is configured to: perform an ungraceful shutdown (UGSD) operation; power up the device; detect that a UGSD event occurred; and perform a UGSD mount operation, wherein the UGSD mount operation comprises load valid uSlices from the memory device to random access memory, wherein uSlices are portions of a shadow update layer (uLayer), and wherein the shadow uLayer is configured to maintain updates for protected RAM segments (mSets), and wherein protected mSets are stored in the memory device after consolidation. The uSlices are loaded one by one. The uSlices are loaded in chronological order. The controller is configured to replace headers for the shadow uLayer with copies made during a control sync (CS) operation. The controller is configured to load a non-shadow uLayer as is during UGSD mount. The controller is configured to replace headers for the uLayer with copies made during a control sync (CS) operation. The controller is configured to distribute the RAM for the shadow uLayer and a non-shadow uLayer.

In another embodiment, a data storage device comprises: means to store data; and a controller coupled to the means to store data, wherein the controller is configured to: maintain both an update layer (uLayer) and a shadow uLayer, wherein the uLayer corresponds to non-protected segments (mSets) stored in random access memory (RAM) and the shadow uLayer corresponds to protected mSets; selectively store portions of the shadow uLayer (uSlices) in the means to store data; and invalidate uSlices upon storing protected mSets to the means to store data. The controller is configured to accumulate updates for the shadow uLayer in a host memory buffer (HMB). The controller is configured to save a uSlice multiple times prior to consolidation of the shadow uLayer.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:

a memory device; and a controller coupled to the memory device, wherein the controller is configured to:

maintain an update layer (uLayer), wherein the uLayer is configured to maintain updates for non-protected segments (mSets), wherein non-protected mSets remain resident in random access memory (RAM) until a control sync (CS) operation; and maintain a shadow uLayer, wherein the shadow uLayer is configured to maintain updates for protected mSets, wherein protected mSets are stored in the memory device after consolidation, wherein the controller is configured to perform the CS operation, wherein during the CS operation all non-protected mSets are stored in the memory device, and wherein during the CS operation portions of the shadow uLayer (uSlices) are stored in the memory device.

2. The data storage device of claim 1, wherein the shadow uLayer is never searched.

3. The data storage device of claim 1, wherein the controller is configured to periodically store a portion of the shadow uLayer (uSlice) in the memory device.

4. The data storage device of claim 1, wherein the controller is configured to store the protected mSets in the memory device and invalidate the uSlice.

5. The data storage device of claim 1, wherein the controller is configured to balance between storing uSlices in the memory device and protected mSets in the memory device.

6. A data storage device, comprising:

a memory device; and a controller coupled to the memory device, wherein the controller is configured to:

maintain an update layer (uLayer), wherein the uLayer is configured to maintain updates for non-protected segments (mSets), wherein non-protected mSets remain resident in random access memory (RAM) until a control sync (CS) operation; and maintain a shadow uLayer, wherein the shadow uLayer is configured to maintain updates for protected mSets, wherein protected mSets are stored in the memory device after consolidation, wherein a correspondence between regions in the uLayer and the shadow uLayer is not 1:1, and wherein a correspondence between regions in the uLayer and uSlices is not 1:1.

7. The data storage device of claim 6, wherein RAM for the uLayer and the shadow uLayer is shared.

8. The data storage device of claim 7, wherein the controller is configured to select either the uLayer or the shadow uLayer or both for consolidation upon a determination that there are no free items in the shared RAM.

9. A data storage device, comprising:

a memory device; and a controller coupled to the memory device, wherein the controller is configured to:

perform an ungraceful shutdown (UGSD) operation;

power up the device;

detect that a UGSD event occurred; and perform a UGSD mount operation, wherein the UGSD mount operation comprises load valid uSlices from the memory device to random access memory, wherein uSlices are portions of a shadow update layer (uLayer), and wherein the shadow uLayer is configured to maintain updates for protected RAM segments (mSets), and wherein protected mSets are stored in the memory device after consolidation, wherein the uSlices are loaded one by one.

10. The data storage device of claim 9, wherein the uSlices are loaded in chronological order.

11. The data storage device of claim 10, wherein the controller is configured to replace headers for the shadow uLayer with copies made during a control sync (CS) operation.

12. The data storage device of claim 9, wherein the controller is configured to load a non-shadow uLayer as is during UGSD mount.

13. The data storage device of claim 12, wherein the controller is configured to replace headers for the uLayer with copies made during a control sync (CS) operation.

14. The data storage device of claim 9, wherein the controller is configured to distribute the RAM for the shadow uLayer and a non-shadow uLayer.

15. A data storage device, comprising:

means to store data; and a controller coupled to the means to store data, wherein the controller is configured to:

maintain both an update layer (uLayer) and a shadow uLayer, wherein the uLayer corresponds to non-protected segments (mSets) stored in random access memory (RAM) and the shadow uLayer corresponds to protected mSets;

selectively store portions of the shadow uLayer (uSlices) in the means to store data; and invalidate uSlices upon storing protected mSets to the means to store data, wherein the controller is configured to accumulate updates for the shadow uLayer in a host memory buffer (HMB).

16. A data storage device, comprising:

means to store data; and a controller coupled to the means to store data, wherein the controller is configured to:

maintain both an update layer (uLayer) and a shadow uLayer, wherein the uLayer corresponds to non-protected segments (mSets) stored in random access memory (RAM) and the shadow uLayer corresponds to protected mSets;

selectively store portions of the shadow uLayer (uSlices) in the means to store data; and invalidate uSlices upon storing protected mSets to the means to store data, wherein the controller is configured to save a uSlice multiple times prior to consolidation of the shadow uLayer.

* * * * *